United States Patent [19]

Kurth et al.

[11] 4,127,479
[45] Nov. 28, 1978

[54] APPARATUS FOR STRAINING SUSPENSIONS

[75] Inventors: Klaus Kurth; Josef Trä; Werner Lorenz, all of Heidenheim (Brenz), Germany

[73] Assignee: J. M. Voith G.m.b.H., Heidenheim, Germany

[21] Appl. No.: 827,396

[22] Filed: Aug. 24, 1977

Related U.S. Application Data

[63] Continuation of Ser. No. 676,231, Apr. 12, 1976, abandoned, which is a continuation of Ser. No. 515,611, Oct. 17, 1974, abandoned.

[30] Foreign Application Priority Data

Nov. 8, 1973 [DE] Fed. Rep. of Germany ....... 2355767

[51] Int. Cl.² .............................................. B07B 1/20
[52] U.S. Cl. .................................... 209/273; 209/255; 209/306; 210/415
[58] Field of Search .............. 209/262, 273, 305, 306, 209/255, 258, 270; 210/326, 334, 415

[56] References Cited
U.S. PATENT DOCUMENTS

| 2,796,809 | 6/1957 | Sprau | 209/273 |
| 3,232,436 | 2/1966 | Nilsson | 210/415 X |
| 3,363,759 | 1/1968 | Clarke-Pounder | 209/273 |
| 3,399,772 | 9/1968 | Salomon | 209/306 X |
| 3,458,038 | 7/1969 | Young | 209/273 X |

Primary Examiner—Frank W. Lutter
Assistant Examiner—Ralph J. Hill
Attorney, Agent, or Firm—Edwin E. Greigg

[57] ABSTRACT

An apparatus for straining liquid fibrous suspensions to remove contaminants and foreign objects has a stationary screen basket located in a housing. Purging blades rotate in the interior of the screen basket in close proximity to the interior walls of the screen and create pressure pulses, causing trapped contaminants and foreign objects to migrate toward an outlet, whereas the purified suspension, including the useful fibers, passes through the screens.

The average path traversed in the apparatus by contaminants and foreign objects is shortened due to the disposition of an intermediate chamber, at mid-height of the screen basket, through which contaminants may also be eliminated from the apparatus. The purging blades are appropriately extended to sweep the walls of this intermediate chamber. The shortened average path reduces the probability that contaminants will pass through the screen on their way to the outlet.

10 Claims, 4 Drawing Figures

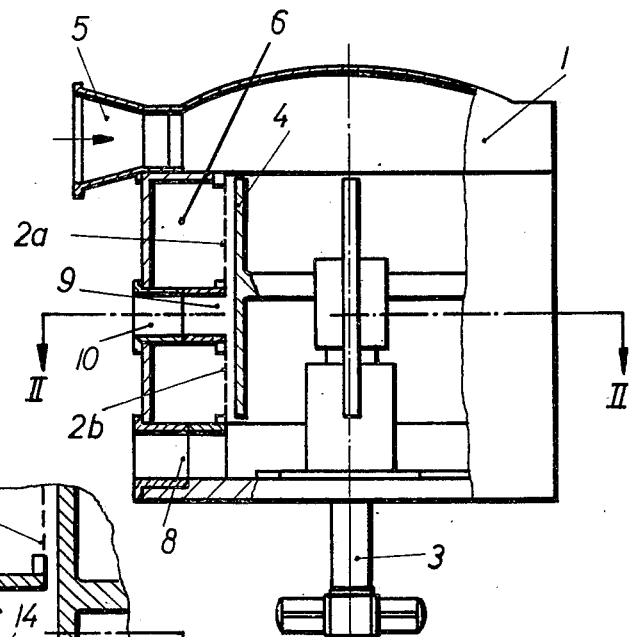
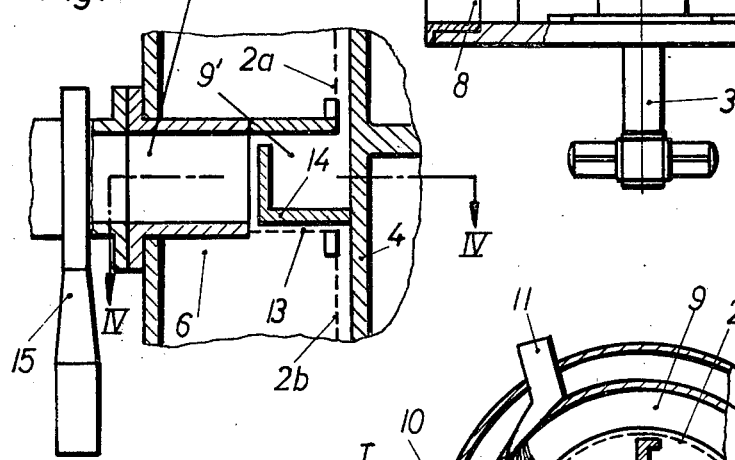
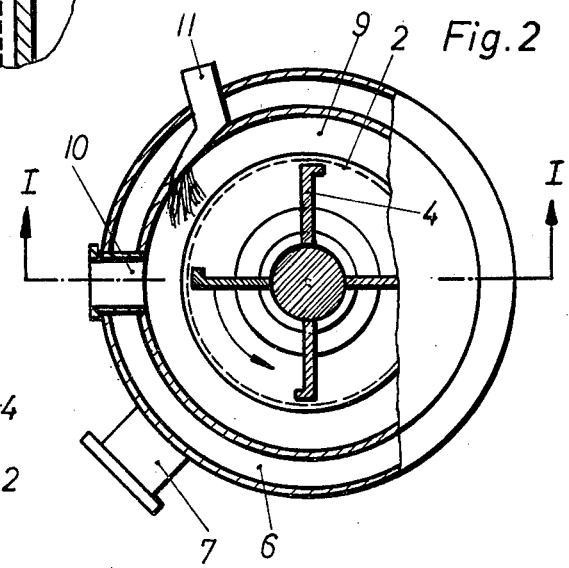
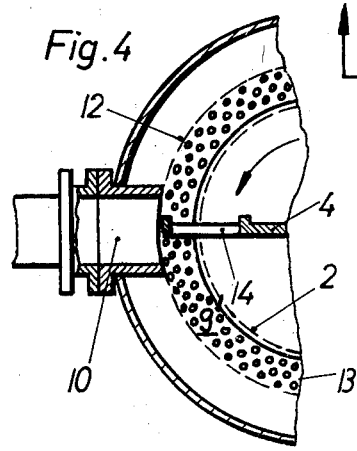

APPARATUS FOR STRAINING SUSPENSIONS

The present application is a continuation of application Ser. No. 676,231, filed Apr. 12, 1976, now abandoned, which, in turn, is a continuation of application Ser. No. 515,611, filed Oct. 17, 1974, now abandoned.

BACKGROUND OF THE INVENTION

The invention relates to an apparatus for straining suspensions, especially fibrous suspensions, including a housing, a rotationally symmetric screen basket and coaxially rotating purging blades for sweeping retained objects from the surface of the screen basket. The apparatus further includes an inlet for the unpurified liquid suspension and a drain for the purified suspension, as well as an outlet at the downstream end of the screen basket for releasing the screened-out impurities. Straining apparatus of this general construction, of both open and closed type, is used especially in the paper industry for removing contaminants or foreign objects from fibrous suspensions. A suspension of cellulose and wood pulp may contain splinters, fiber bundles, sand and the like and when old paper is recycled, pieces of foil and styrofoam, splinters and the like may have to be removed from the suspension. The suspension to be purified is usually admitted at one end of the strainer. When the straining takes place under pressure, the suspension fills the entire volume of the strainer. When the straining takes place without pressure, in an apparatus where the suspension flows from the inside to the outside, i.e., in a straining apparatus where the suspension flows under centrifugal force, the centrifugal effect of the purging blades causes the formation of a fluid layer of a certain thickness on the inside of the screen basket. Strainers of the type described above can, however, also use flows which proceed from the exterior toward the interior of the apparatus.

The contaminants trapped by the screen are removed from the strainer at the downstream end of the screen basket either in free outflow or with the aid of a control member, for example, a shut-off valve. Partly, because of gravity, and partly due to the effects of the purging blades which are usually disposed slightly helically, the contaminants are gradually transported toward the outlet. The rotation of the purging blades generates positive and negative-going pressure pulses, each of which transports the contaminants a small distance toward the end of the screen basket.

One disadvantage of this apparatus, especially in larger strainers is the risk that contaminants which are deposited near the inlet of the screen may still find their way through the screen while they migrate to the outlet. This could happen if they are further comminuted or if, for example, elongated splinters assume a position for passing through the holes in the screen.

OBJECT AND SUMMARY OF THE INVENTION

It is an object of the invention to provide a straining apparatus of the type described above whose efficiency is increased, i.e., wherein, by comparison to known straining apparatus using the same screen size, a purer product is obtained or else, when a product of the same degree of purity is obtained, a coarser screen basket may be used, thus increasing the throughput.

This object is attained, according to the invention, by providing the apparatus with one or more intermediate chambers, located between the inlet and outlets. The chambers may be created by interrupting the wall of the screen basket, and a secondary outlet may be installed therein through which contaminants and foreign objects may be eliminated from the apparatus.

The intermediate chamber or chambers and their outlets shorten the average path that contaminants must travel on the surface of the screen basket, thus eliminating the possibility that trapped contaminants will still pass through the screen.

German Auslegeschrift No. 1,249,652 has already made known a straining apparatus for fibrous suspensions, in which the screen consists of two parts, but both parts of the screen only have one common outlet for the contaminants, and this outlet is located at the end of the second screen. Thus the disadvantages cited above are not overcome in this known apparatus.

In a further characteristic of the invention, the screen basket can be provided with means in the vicinity of the intermediate chambers, defining openings of such a size that all of the contaminants accumulated up to that point will enter the intermediate chamber, or else, the screen basket may simply be formed as referred to hereinafter and comprising a plurality of parts.

A still further feature of the invention reduces the loss of fiber by permitting the passage of purified suspension through at least one of the walls of said intermediate chamber. During normal operation a pressure gradient exists in the strainer in the direction of the outlet for the purified product, thus fibers located in the intermediate chambers eventually arrive at the purified product outlet. In an advantageous manner, the circumferential wall is perforated in the manner of a screen. In a further advantageous manner, the base wall of said at least one intermediate chamber is perforated in the manner of a screen. The result of reducing the loss of fibers is improved even more, if the circumferential wall and the base wall of said at least one intermediate chamber are perforated in the manner of a screen. According to yet another feature, the secondary outlet is provided with a shut-off valve which is only opened intermittently. This arrangement keeps the fiber losses low.

In order to prevent clogging of the intermediate chambers, the purging blades are advantageously provided with extensions protruding into the intermediate chambers.

Another possibility to keep the fiber losses as low as possible is provided by a further characteristic of the invention, which provides spray nozzles through which a cleaning fluid, preferably water, is injected into the intermediate chambers to flush out accumulated fibers.

In an advantageous manner, the intermediate chambers of the interruptions in the screen are disposed near the middle of the screen basket. The intermediate chambers may include either several parts distributed about the housing or else they may be formed as indicated hereinafter, as annular chambers with outlets on their outer periphery.

BRIEF DESCRIPTION OF THE DRAWING

Exemplary embodiments of the invention are described with the aid of the drawing in which:

FIG. 1 is a partial section of a straining apparatus according to the invention;

FIG. 2 is a section along the line II—II according to FIG. 1;

FIG. 3 is a partial, longitudinal, sectional view through another straining apparatus; and FIG. 4 is a section along a line IV—IV according to FIG. 3.

DESCRIPTION OF THE PREFERRED EMBODIMENTS

The straining apparatus substantially comprises a housing 1 in which there is disposed a fixed annular screen basket 2 comprising two annular parts 2a and 2b. A shaft 3, powered by a motor (not shown) drives purging blades 4 which rotate with a small clearance along the inside surface of the screen basket 2. An inlet 5 admits the impure suspension into the top of the housing 1. The purified suspension which passes through the screen accumulates in an annular chamber 6 to which a drain 7 is connected. An outlet 8 for carrying the contaminants out of the system is attached to the downstream end of the screen basket 2. Located between the two screen basket parts 2a and 2b is an intermediate chamber embodied as an annulus 9 which is provided with a secondary outlet 10 for removing the contaminants accumulating in the annular chamber 9. A nozzle 11 is mounted tangentially to the annular chamber for flushing lodged fibers out of the interstices in the screen.

A further exemplary embodiment is partially depicted in FIGS. 3 and 4. The circumferential vertical wall 12 and the base 13 of the annular chamber 9' are embodied as screens which may have one or more unperforated sections, for greater rigidity. In order to prevent clogging of these screen portions, the purging blades 4 have extensions 14 which extend into the annular chamber 9'. From time to time, a shut-off valve 15 is opened to evacuate accumulated contaminants from the annular chamber 9'. Useful fibers, which have accumulated in the annular chamber 9', are transported, due to the pressure gradient, through the screen-like circumferential wall 12 and base wall 13 into the annular chamber 6.

Modifications of the invention may be made without departing from its spirit and scope, which is defined in the appended claims.

What is claimed is:

1. An apparatus for straining a liquid suspension containing suspended contaminants, comprising:
    a housing defining an axis and an interior volume, said housing including a sole inlet at one part thereof for receiving unstrained liquid suspension and including a sole drain located at another part of said housing, downstream and axially remote from said sole inlet, for discharging strained liquid suspension, said housing further defining a coaxial annular chamber extending around said volume at an intermediate axial position between said sole inlet and said sole drain;
    a rotationally symmetric, substantially cylindrical sectional screen basket disposed in said interior volume of said housing coaxially with said housing and having sections extending on either side of said annular channel and defining a continuous interior space which communicates with said sole inlet and with said annular channel substantially entirely around the inner periphery of said channel;
    at least a first and a second separate outlet communicating with said interior space for removing strained-out contaminants and solid matter from said housing, said first outlet being located in said housing in a position axially remote from said inlet and said second outlet being located at said intermediate axial position between said sole inlet and said first outlet and communicating with said interior space and said annular chamber; and
    a sole rotatable impeller equipped with purging blades for sweeping and clearing the inside wall of said screen basket and means for holding and rotating said impeller, said purging blades extending axially and continuously along said screen basket and across said annular chamber; whereby said purging blades push trapped contaminants radially into said annular chamber.

2. A straining apparatus as defined in claim 1, wherein said screen basket is formed of at least two individual parts and said annular chamber is located between said individual parts.

3. A straining apparatus as defined in claim 1, wherein at least one of the walls of said chamber has openings which permit the passage of purified suspension therethrough.

4. A straining apparatus as defined in claim 3, wherein said chamber includes a circumferential wall which is perforated in the manner of a screen.

5. A straining apparatus as defined in claim 3, wherein said chamber includes a base wall which is perforated in the manner of a screen.

6. A straining apparatus as defined in claim 3, wherein said chamber includes a circumferential wall and a base wall which are perforated in the manner of a screen.

7. A straining apparatus as defined in claim 23, wherein said second outlet includes a valve 8. A straining apparatus as defined in claim 1, wherein said annular purging blades extend into said chamber.

9. A straining apparatus as defined in claim 23, futher comprising at least one nozzle, disposed substantially tangentially to said annular chamber and terminating therein.

10. A straining apparatus as defined in claim 1, wherein said annular chamber is located medially of the axial extent of said screen basket.

* * * * *